United States Patent [19]
Kadowaki

[11] Patent Number: 5,144,606
[45] Date of Patent: Sep. 1, 1992

[54] FOCUSING-ERROR DETECTING APPARATUS WITH A SIMPLE PHOTODETECTOR UNIT FOR USE IN AN OPTICAL RECORDING/REPRODUCING DEVICE

[75] Inventor: Shinichi Kadowaki, Osaka, Japan

[73] Assignee: Matsushita Electric Industrial Co., Ltd., Osaka, Japan

[21] Appl. No.: 762,989

[22] Filed: Sep. 20, 1991

[30] Foreign Application Priority Data

Sep. 26, 1990 [JP] Japan .................. 2-258046

[51] Int. Cl.$^5$ ................................ G11B 7/00
[52] U.S. Cl. .................. 369/44.41; 369/44.23; 369/44.37; 369/103
[58] Field of Search ............ 369/44.41, 44.42, 44.11, 369/44.12, 44.23, 44.24, 100, 103, 112, 44.37; 250/201.5

[56] References Cited

U.S. PATENT DOCUMENTS 4,712,205 12/1987 Smid et al. .................. 369/44.41
4,718,052 1/1988 Kondo et al. .................. 369/44.41
5,004,900 4/1991 Seya et al. .................. 369/44.24

FOREIGN PATENT DOCUMENTS 61-3330 1/1986 Japan .

Primary Examiner—Roy N. Envall, Jr.
Assistant Examiner—Hung Dang
Attorney, Agent, or Firm—Lowe, Price, LeBlanc & Becker

[57] ABSTRACT

A light source emits a light beam. A focusing optical system focuses the light beam on an information recording medium. First and second strip-shape photodetectors approximately extend on a common plane. First and second return light beams are generated on the basis of a light beam reflected and diffracted back from the medium. The return light beams have different focal points. Centers of the return light beams are received by the photodetectors respectively. The focal points of the first and second return light beams lie at a front side and a rear side of light-receiving surfaces of the first and second photodetectors respectively when sizes of the return light beams on the light-receiving surfaces of the photodetectors are equal. A focusing-error signal is generated in response to a difference between output signals from the first and second photodetectors. The first and second photodetectors extend approximately in parallel. The first and second photodetectors have approximately equal widths which agree with a value $W_x$. A distance "d" between centers of the first and second return light beams on the first and second photodetectors is equal to or smaller than a sum of a value D and the value $W_x$ which is measured along a direction parallel to a line connecting the centers of the first and second return light beams. The value D is equal to diameters of the first and second return light beams on the first and second photodetectors when the diameters of the first and second return light beams on the first and second photodetectors are equal.

3 Claims, 5 Drawing Sheets

FOCUSING-ERROR DETECTING APPARATUS WITH A SIMPLE PHOTODETECTOR UNIT FOR USE IN AN OPTICAL RECORDING/REPRODUCING DEVICE

BACKGROUND OF THE INVENTION

This invention relates to a focusing-error detecting apparatus usable in a system for optically reproducing, recording, or erasing information from, or on an optical or magneto-optical recording medium.

An optical recording medium such as an optical disk is formed with a pattern of a groove or pits which represents recorded information. Some optical pickup heads are used in reproducing information from such an optical recording medium. In general, the optical pickup head applies a laser light beam to the optical recording medium and detects the laser light beam reflected back from the optical recording medium. Since the reflected laser light beam depends on a pattern on the optical recording medium, the reflected laser light beam represents information on the optical recording medium. Thus, the detection of the reflected laser light beam enables the reproduction of the information.

Such optical pickup heads have three basic functions. The first function is to focus the laser light beam into a micro-spot on the optical recording medium. The size of the light beam spot preferably corresponds to a diffraction limit. The second function relates to focusing control of the light beam. The third function relates to tracking control of the light beam.

In general, focusing control includes detection of a focusing error. A spot size detection method is known as a typical method of detecting a focusing error. As will be explained later, a prior-art focusing-error detecting apparatus based on a spot size detection method has some problem.

SUMMARY OF THE INVENTION

It is an object of this invention to provide an improved focusing-error detecting apparatus.

This invention provides a focusing-error detecting apparatus comprising a light source emitting a light beam; a focusing optical system focusing the light beam from the light source on an information recording medium; a photodetector unit including first and second strip-shape photodetectors approximately extending on a common plane; means for generating first and second return light beams on the basis of a light beam reflected and diffracted back from the medium, the first and second return light beams having different focal points, wherein centers of the first and second return light beams are received by the first and second photodetectors respectively, wherein the focal points of the first and second return light beams lie at a front side and a rear side of light-receiving surfaces of the first and second photodetectors respectively when sizes of the first and second return light beams on the light-receiving surfaces of the first and second photodetectors are equal; and means for detecting a difference between output signals from the first and second photodetectors, and generating a focusing-error signal in response to the detected difference; wherein the first and second photodetectors extend approximately in parallel; the first and second photodetectors have approximately equal widths which agree with a value $W_x$; a distance "d" between centers of the first and second return light beams on the first and second photodetectors is equal to or smaller than a sum of a value D and the value $W_x$ which is measured along a direction parallel to a line connecting the centers of the first and second return light beams; and the value D is equal to diameters of the first and second return light beams on the first and second photodetectors when the diameters of the first and second return light beams on the first and second photodetectors are equal.

DESCRIPTION OF THE PRIOR ART

Figure 1:
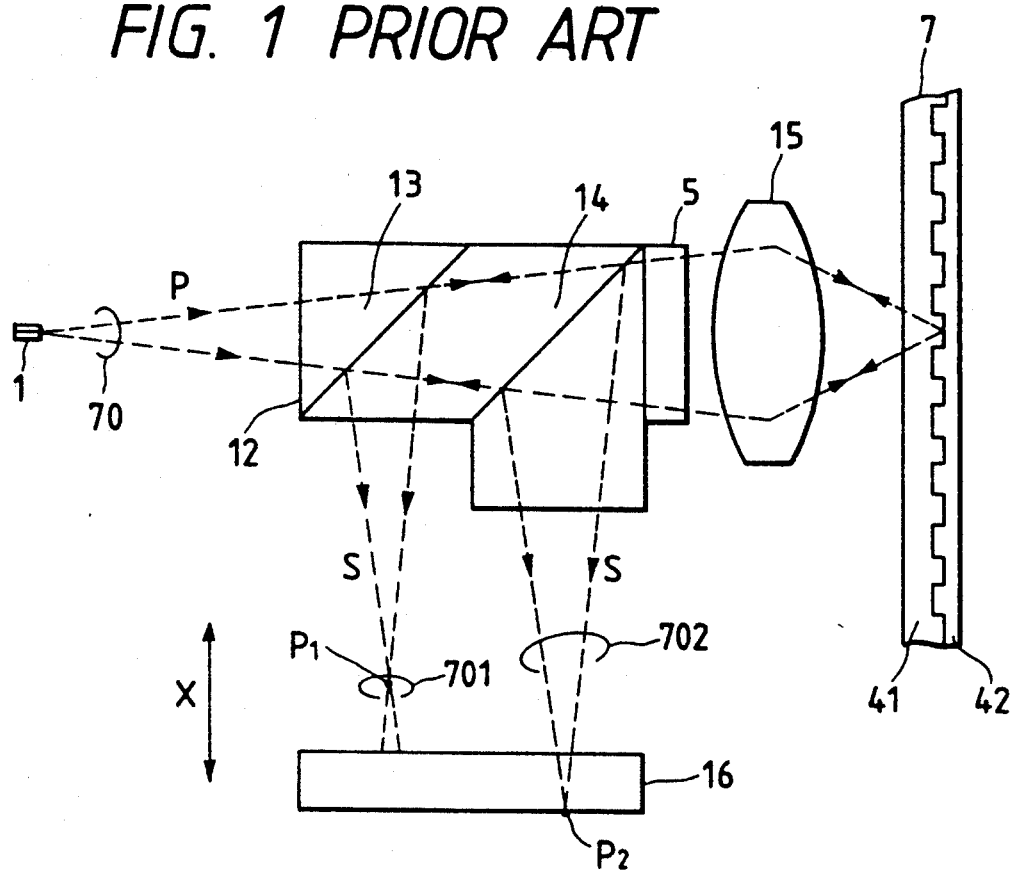
FIG. 1 is a diagram of a prior-art focusing-error detecting apparatus.

FIG. 1 shows a prior-art optical recording/reproducing head disclosed in Japanese published unexamined patent application 61-3330. The prior-art optical recording/reproducing head is based on a spot size detection method.

With reference to FIG. 1, the prior-art optical recording/reproducing head includes a light source 1 such as a semiconductor laser, a prism 12, an objective lens 15 of the finite focal-point type, and a photodetector unit 16. The prior-art optical recording/reproducing head acts on an optical disk 7.

Figure 2:
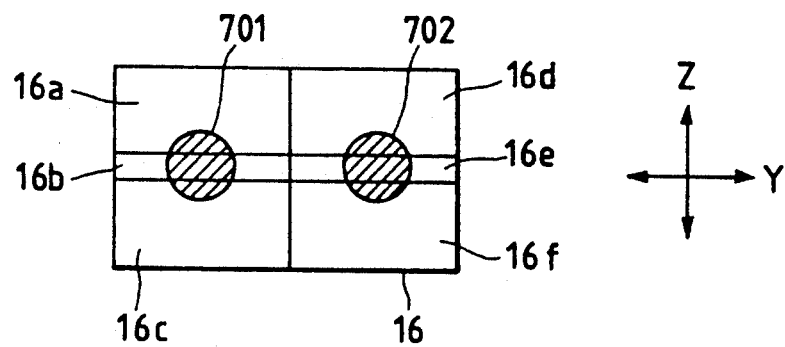
FIG. 2 is a front view of the photodetector unit of FIG. 1.

As shown in FIG. 2, the photodetector unit 16 includes an arrangement or array of photodetectors 16a, 16b, 16c, 16d, 16e, and 16f.

As shown in FIG. 1, the prism 12 includes a first polarization beam splitter 13, a second polarization beam splitter 14, and a quarter wave plate 5. The first polarization beam splitter 13 transmits p-polarized light at about 100%, and reflects s-polarized light at about 100%. The second polarization beam splitter 14 transmits p-polarized light at about 100%, and reflects about 50% of s-polarized light and transmits about 50% of s-polarized light.

The light source 1 emits a light beam 70, which forms p-polarized light beam incident to the prism 12. About 100% of the light beam 70 emitted from the light source 1 passes through the polarization beam splitters 13 and 14, being incident to the quarter wave plate 5 and being converted by the quarter wave plate 5 into a circularly-polarized light beam. After exiting from the quarter wave plate 5, the circularly-polarized light beam is incident to the objective lens 15 and is focused by the objective lens 15 into a spot on the optical disk 7.

The optical disk 7 includes a substrate or a base plate 42 coated with a protective film 41. The substrate 42 is formed with a pattern of a groove or pits which represents recorded information. The laser light beam 70 is reflected and diffracted back from the optical disk 7, passing through the objective lens 15 and entering the quarter wave plate 5. The return laser light beam is converted by the quarter wave plate 5 into an s-polarized light beam, being incident to the polarization beam splitter 14 in the prism 12. The polarization beam splitter 14 reflects about 50% of the s-polarized light beam, generating a reflected light beam 702. The polarization beam splitter 14 transmits about 50% of the s-polarized light beam, and the transmitted light beam is incident to the polarization beam splitter 13 and is reflected by the polarization beam splitter 13 to form a reflected light beam 701. The quantities of the reflected light beams 701 and 702 are approximately equal. Image formation positions P1 and P2 of the reflected light beams 701 and 702 are separated from each other in the X direction by a distance corresponding to the distance between the active surfaces of the polarization beam splitters 13 and 14.

A six-segment array of the photodetectors 16a–16f extends on a plane which is approximately equidistant from the image formation positions P1 and P2 in the X direction. The reflected light beams 701 and 702 form circles on the photodetector array. In the case where the light beam 70 is accurately focused on the optical disk 7, the circles of the reflected light beams 701 and 702 are wider than the photodetectors 16b and 16e and have equal diameters. As the light beam 70 is de-focused on the optical disk 7, the circles of the reflected light beams 701 and 702 are different in size.

An electrical circuit connected to the photodetectors 16a–16f includes adders and a subtracter, generating a focusing-error signal FE in response to the output electric currents Ia–If from the photodetectors 16a–16f by referring to the following equation.

$$FE = (Ib + Id + If) - (Ia + Ic + Ie) \quad (1)$$

The prior-art optical recording/reproducing head of FIGS. 1 and 2 is based on a spot size detection method in which two light beams of circular cross-sections are detected by a plurality of photodetectors, and the outputs from the photodetectors are subjected to a subtraction or a difference calculation to obtain a focusing-error signal. According to the spot size detection method, a focusing error can be accurately and stably detected even when a small alignment error occurs in the related optical system.

The prior-art optical recording/reproducing head of FIGS. 1 and 2 has the following problems The six-segment photodetector array occupies a large area, causing a great size of the head. The large photodetector array is expensive, causing a high cost of the head.

DESCRIPTION OF THE FIRST PREFERRED EMBODIMENT

Figure 3:
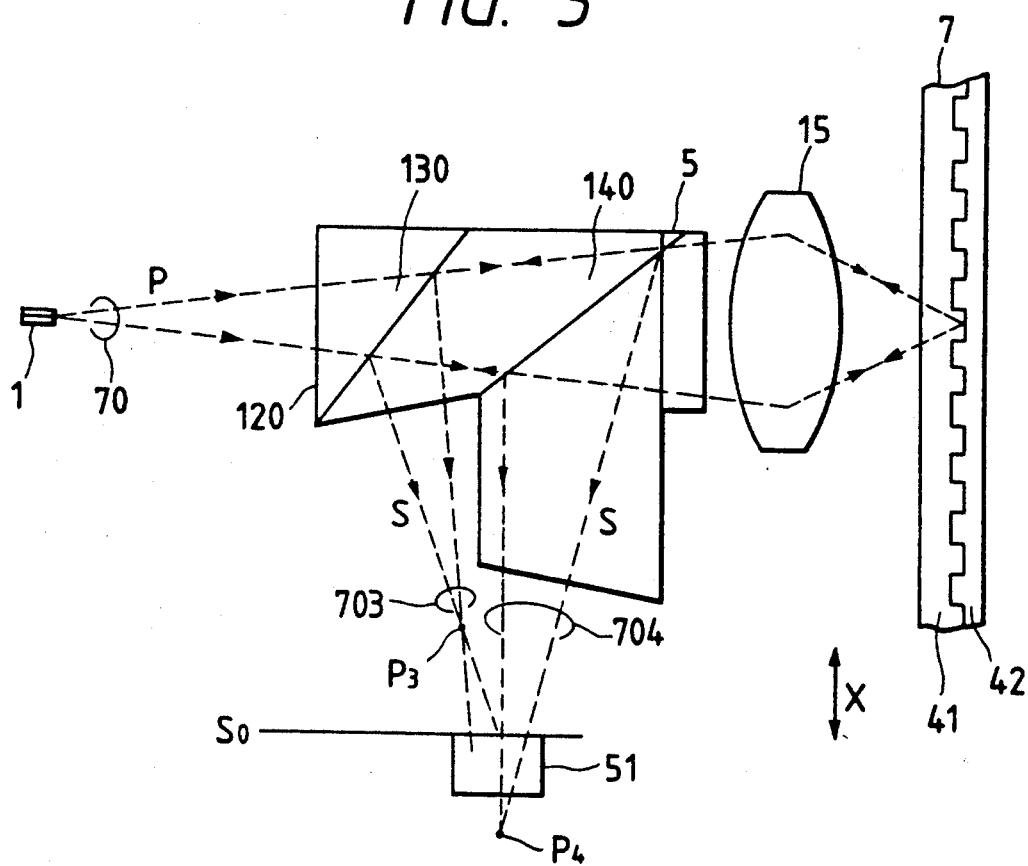
FIG. 3 is a diagram of a focusing-error detecting apparatus according to a first embodiment of this invention.

With reference to FIG. 3, an optical recording/reproducing head includes a light source 1 such as a semiconductor laser, a prism 120, an objective lens 15 of the finite focal-point type, and a photodetector unit 51. The optical recording/reproducing head acts on an optical recording medium 7 such as an optical disk. The light source 1 emits a coherent light beam 70 having a wavelength of, for example, 780 nm. As will be made clear later, the prism 120 has two reflection/transmission films or inner boundaries.

Figure 4:
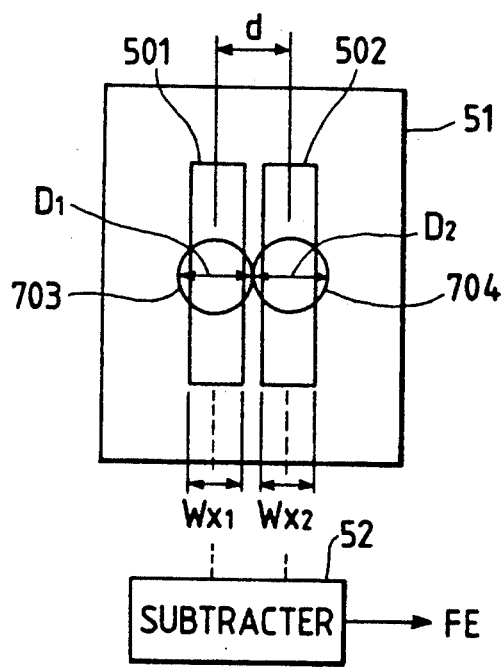
FIG. 4 is a diagram including a front view of the photodetector unit of FIG. 3.

As shown in FIG. 4, the photodetector unit 51 includes photodetectors 501 and 502 substantially extending parallel to each other and having a same shape of a rectangular strip.

As shown in FIG. 3, the prism 120 includes a first polarization beam splitter 130, a second polarization beam splitter 140, and a quarter wave plate 5. The first polarization beam splitter 130 transmits p-polarized light at about 100%, and reflects s-polarized light at about 100%. The second polarization beam splitter 140 transmits p-polarized light at about 100%, and reflects about 50% of s-polarized light and transmits about 50% of s-polarized light.

The light source 1 emits a light beam 70, which forms p-polarized light beam incident to the prism 120. About 100% of the light beam 70 emitted from the light source 1 passes through the polarization beam splitters 130 and 140, being incident to the quarter wave plate 5 and being converted by the quarter wave plate 5 into a circularly-polarized light beam. After exiting from the quarter wave plate 5, the circularly-polarized light beam is incident to the objective lens 15 and is focused by the objective lens 15 into a spot on the optical disk 7.

The optical disk 7 includes a substrate or a base plate 42 coated with a protective film 41. The substrate 42 is formed with a pattern of a groove or pits which represents recorded information. The laser light beam 70 is reflected and diffracted back from the optical disk 7, passing through the objective lens 15 and entering the quarter wave plate 5. The return laser light beam is converted by the quarter wave plate 5 into an s-polarized light beam, being incident to the polarization beam splitter 140 in the prism 120. The polarization beam splitter 140 reflects about 50% of the s-polarized light beam, generating a reflected light beam 704. The polarization beam splitter 140 transmits about 50% of the s-polarized light beam, and the transmitted light beam is incident to the polarization beam splitter 130 and is reflected by the polarization beam splitter 130 to form a reflected light beam 703. The quantities of the reflected light beams 703 and 704 are approximately equal. Image formation positions P3 and P4 of the reflected light beams 703 and 704 are separated from each other in the X direction by a distance corresponding to the distance between the active surfaces of the polarization beam splitters 130 and 140.

The photodetectors 501 and 502 extend on a front surface So of the photodetector unit 51. The front surface So of the photodetector unit 51 extends on a plane which is approximately equidistant from the image formation positions P3 and P4 in the X direction. The reflected light beams 703 and 704 form circles on and around the photodetectors 501 and 502 respectively. In the case where the light beam 70 is accurately focused on the optical disk 7, the circles of the reflected light beams 703 and 704 are wider than the photodetectors 501 and 502 and have equal diameters. Specifically, the diameter $D_1$ of the circle of the reflected light beam 703 is greater than the width $W_{x1}$ of the photodetector 501, and the diameter $D_2$ of the circle of the reflected light beam 704 is greater than the width $W_{x2}$ of the photodetector 502. In addition, the diameter $D_1$ of the circle of the reflected light beam 703 is equal to the diameter $D_2$ of the circle of the reflected light beam 704. As the light beam 70 is de-focused on the optical disk 7, the circles of the reflected light beams 703 and 704 are different in size.

In the case where an optical disk is used as the optical recording medium 7, since a desired accuracy of focusing control of the applied light beam 70 generally corresponds to 1 μm, a semiconductor laser emitting coherent light is preferably used as the light source 1. When a lower accuracy of focusing control suffices, a light emitting diode or a lamp can be used as the light source 1.

The photodetectors 501 and 502 are electrically connected to input terminals of a subtracter or a differential amplifier 52 respectively. The subtracter 52 detects the difference between the output signals from the photodetectors 501 and 502, outputting a focusing-error signal FE depending on the detected difference. The focusing-error signal FE represents an error in the focusing of the light beam 70 applied to the optical disk 7.

Figure 5:
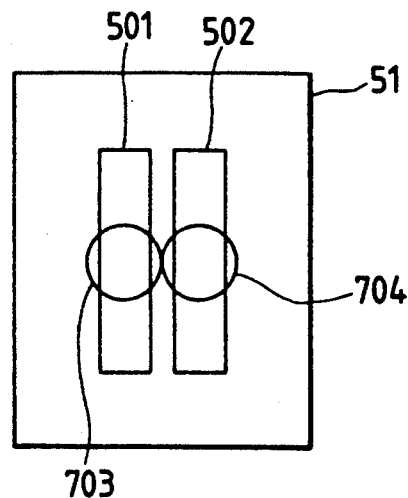
FIGS. 5-7 are front views of the photodetector unit of FIG. 3.
Figure 6:
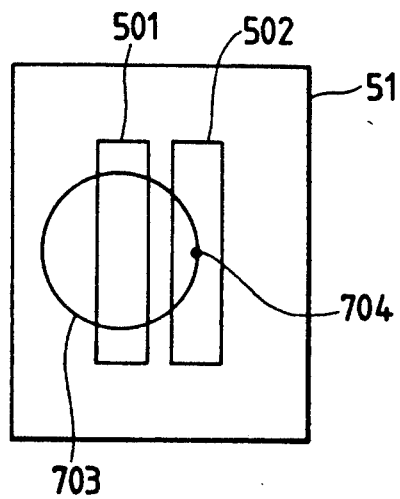
Figure 7:
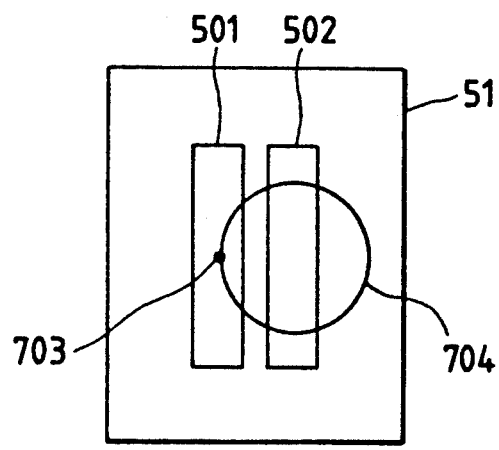

In the case where the light beam 70 is accurately focused on the optical disk 7, the circles of the reflected light beams 703 and 704 extend on and around the photodetectors 501 and 502 and have equal diameters as shown in FIG. 5. In the case where the light beam 70 is de-focused in one direction, the circle of the reflected light beam 703 is greater than the circle of the reflected light beam 704 as shown in FIG. 6. In the case where the light beam 70 is de-focused in the opposite direction, the circle of the reflected light beam 704 is greater than the circle of the reflected light beam 703 as shown in FIG. 7.

Figure 8:
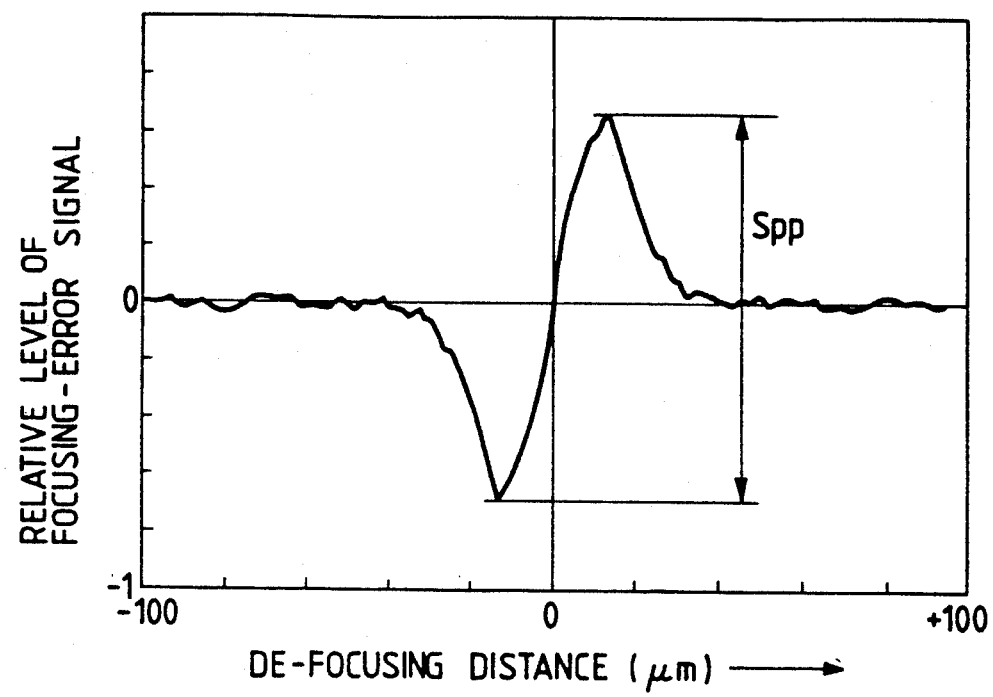
FIG. 8 is a diagram showing the relation between the level of a focusing-error signal and the de-focusing distance.

FIG. 8 shows the results of calculations in which the level of the focusing-error signal FE was computed as the de-focusing distance (the distance or the deviation from the good focusing point) of the light beam 70 applied to the optical disk 7 was continuously varied. The calculations were performed under the following conditions. The transverse magnification α of the objective lens 15 was given as:

$$\alpha = 4$$

The widths $W_{x1}$ and $W_{x2}$ of the photodetectors 501 and 502 were given as:

$$W_{x1} = W_{x2} = 45 \ \mu m$$

In the case where the light beam 70 was accurately focused on the optical disk 7, the diameters $D_1$ and $D_2$ of the circles of the reflected light beams 703 and 704 on and around the photodetectors 501 and 502, and the distance "d" between the centers of the circles were given as:

$$D_1 = D_2 = 63.5 \ \mu m$$

$$d = 63.5 \ \mu m$$

With reference to FIG. 8, the peak-to-peak level Spp of the focusing-error signal FE is defined as the signal detection sensitivity of the photodetector unit 51.

Figure 9:
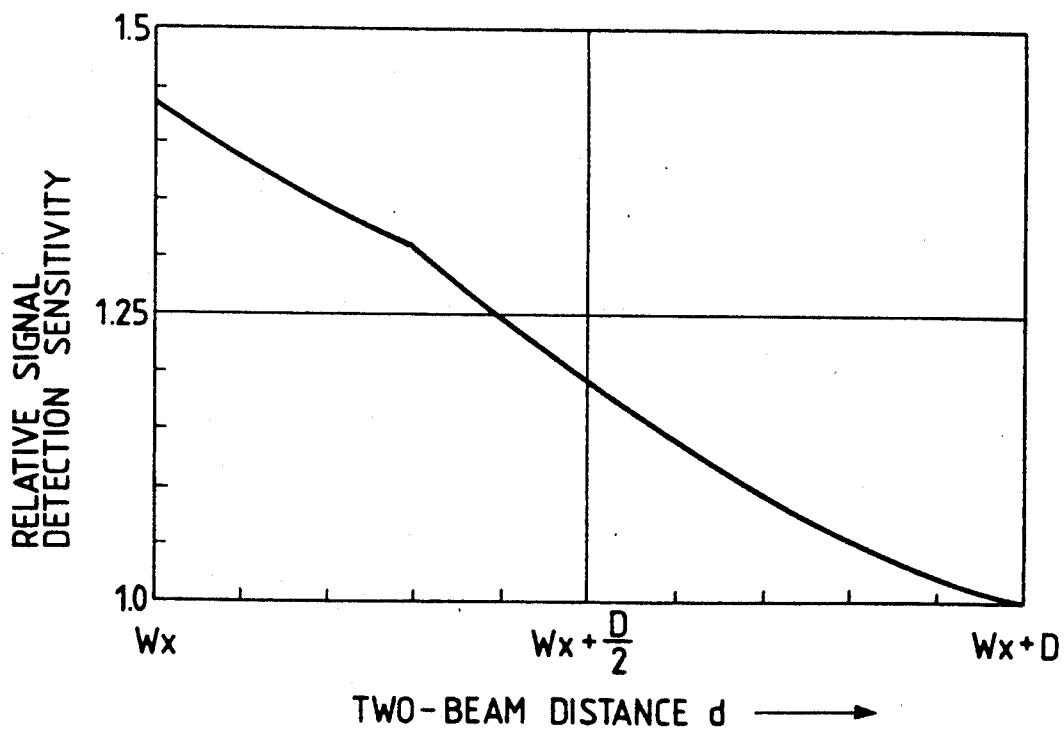
FIG. 9 is a diagram showing the relation between the signal detection sensitivity and the distance between two light beams.

FIG. 9 shows the results of calculations in which the signal detection sensitivity Spp was computed as the distance "d" between the centers of the circles of the reflected light beams 703 and 704 on and around the photodetectors 501 and 502 was varied between the value $W_x$ and the value $W_x + D$. The value $W_x$ and the value $W_x + D$ were given as:

$$W_x = W_{x1} = W_{x2}$$

$$D = D_1 = D_2$$

$$W_x = 0.707 \cdot D$$

In FIG. 9, the computed values of the signal detection sensitivity Spp are expressed as relative values with respect to the computed value of the signal detection sensitivity Spp which is obtained when the distance "d" is equal to the value $W_x + D$. As shown in FIG. 9, the signal detection sensitivity Spp increased as the distance "d" decreased from the value $W_x + D$. When the distance "d" was equal to the value $W_x$, the signal detection sensitivity Spp increased to a factor of 1.43.

The area of the photodetector unit 51 including the photodetectors 501 and 502 can be reduced as the distance "d" is decreased. The area of the photodetector unit 51 which occurs when the distance "d" is equal to the value $W_x$ can be smaller by 40% than the area of the photodetector unit 51 which occurs when the distance "d" is equal to the value $W_x + D$.

As understood from the previous description, by designing the optical recording/reproducing head so that the distance "d" can be small, it is possible to simultaneously realize a small size and a high sensitivity of the photodetector unit 51. As the size of the photodetector unit 51 is reduced, the number of photodetector units which can be formed from a single semiconductor substrate is increased so that the cost of one photodetector unit is dropped. Thus, a small size of the photodetector unit 51 is advantageous in cost. As the size of the photodetector unit 51 is reduced, the photodetector unit 51 is exposed to less stray light causing noise and the photodetector unit 51 generates less noise such as shot noise. Thus, a small size of the photodetector unit 51 is advantageous also in signal-to-noise ratio.

As described previously, the photodetectors 501 and 502 are located so that they will be approximately in parallel. In addition, the photodetectors 501 and 502 are designed so that they have approximately equal widths which agree with the value $W_x$. As described previously, in the case where the light beam 70 is accurately focused on the optical disk 7, the circles of the reflected light beams 703 and 704 on and around the photodetectors 501 and 502 have equal diameters which agree with the value D. It is preferable that the distance "d" between the centers of the reflected light beams 703 and 704 on and around the photodetectors 501 and 502 is equal to or smaller than the sum of the value D and the value $W_x$ which is measured along a direction parallel to the line connecting the centers of the reflected light beams 703 and 704.

DESCRIPTION OF THE SECOND PREFERRED EMBODIMENT

Figure 10:
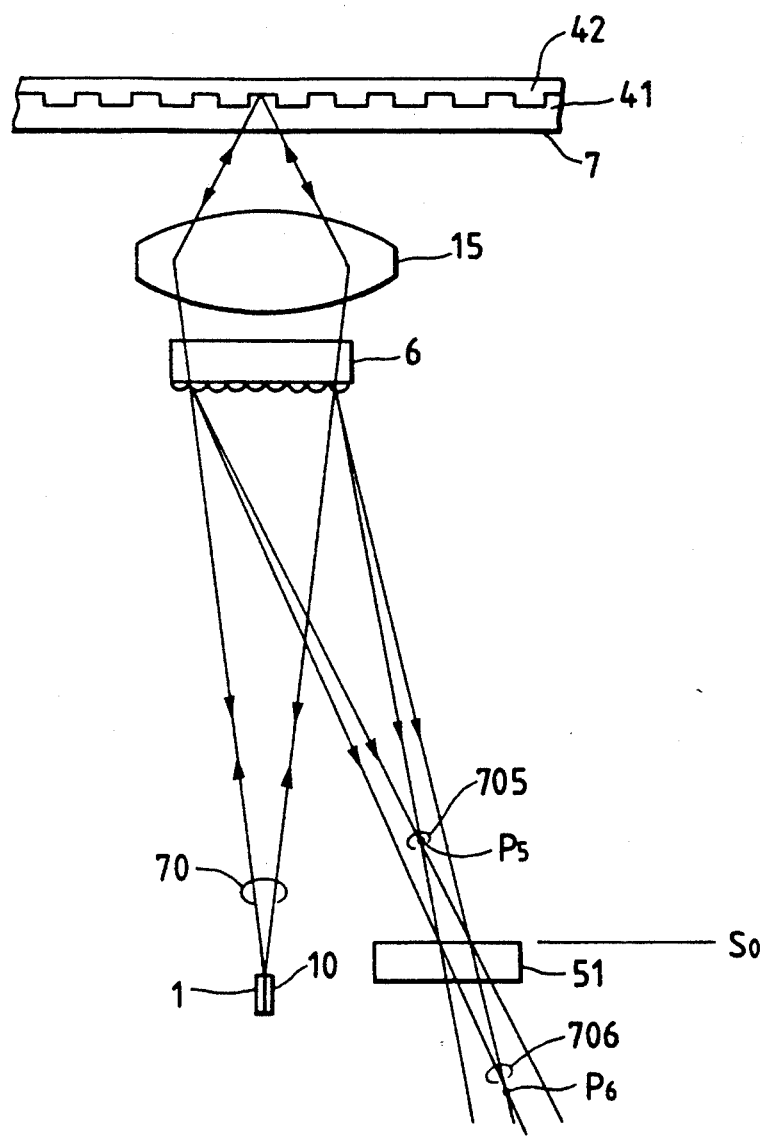
FIG. 10 is a diagram of a focusing-error detecting apparatus according to a second embodiment of this invention.

FIG. 10 shows a second embodiment of this invention which is similar to the embodiment of FIGS. 3–9 except for design changes indicated hereinafter. In the embodiment of FIG. 10, a holographic optical element 6 replaces the prism 120 (see FIG. 3).

As shown in FIG. 10, a light beam 70 emitted from a light source 1 is incident to the holographic optical element 6, and is diffracted by the holographic optical element 6. The holographic optical element 6 is designed so as to reconstruct wavefronts having different focal points. A 0-order diffraction light diffracted from the holographic optical element 6 is focused by an objective lens 15 into a spot on an optical disk 7. The laser light beam 70 is reflected and diffracted back from the optical disk 7, passing through the objective lens 15 and reaching the holographic optical element 6. The holographic optical element 6 generates a 0-order diffraction light beam and other-order diffraction light beams 705 and 706 from the return light beam. The 0-order diffraction light beam moves back toward the light source 1. The other diffraction light beams 705 and 706 travel toward a photodetector unit 51, and reaches the photodetector unit 51.

Figure 11:
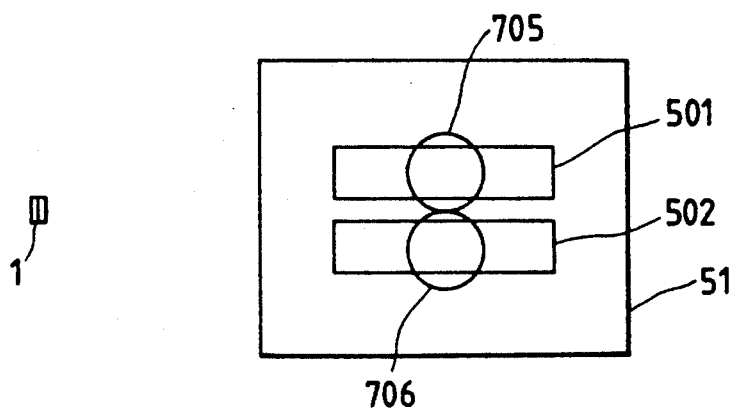
FIG. 11 is a front view of the photodetector unit and the light source of FIG. 10.

The diffraction light beams 705 and 706 form circles on and around photodetectors 501 and 502 of the photodetector unit 51 respectively. In the case where the light beam 70 is accurately focused on the optical disk 7, the circles of the diffraction light beams 705 and 706 are wider than the photodetectors 501 and 502 and have equal diameters. The photodetectors 501 and 502 are positioned relative to the light source 1 as shown in FIG. 11.

The holographic optical element 6 can be fabricated in various ways such as a two-beam interferometry process and a CGH method. A lattice pattern can be recorded on an original member constituting the holographic optical element 6 in the following way. Firstly, point light sources are placed at the light emitting point 10 of the light source 1 and desired focal points P5 and P6 respectively (see FIG. 10). The point light sources emit spherical waves which form an interference pattern on an original member which will constitute the holographic optical element 6. The interference pattern is recorded on the original member as the lattice pattern on the holographic optical element 6.

The photodetectors 501 and 502 are located so that they will be approximately in parallel. In addition, the photodetectors 501 and 502 are designed so that they have approximately equal widths which agree with a value $W_x$. As described previously, in the case where the light beam 70 is accurately focused on the optical disk 7, the circles of the diffraction light beams 705 and 706 on and around the photodetectors 501 and 502 have equal diameters which agree with a value D. It is preferable that the distance "d" between the centers of the diffraction light beams 705 and 706 on and around the photodetectors 501 and 502 is equal to or smaller than the sum of the value D and the value $W_x$ which is measured along a direction parallel to the line connecting the centers of the diffraction light beams 705 and 706. According to this design, even in the presence of an error in the relative positions of the light source 1 and the photodetector unit 51, a stable and accurate focusing-error detection signal FE can be obtained by rotational adjustment of the holographic optical element 6.

Thus, the allowable range of an error in the relative positions of the light source 1 and the photodetector unit 51 can be much wider than that in the prior art design of FIGS. 1 and 2.

What is claimed is:

1. A focusing-error detecting apparatus comprising:
   a light source emitting a light beam;
   a focusing optical system focusing the light beam from the light source on an information recording medium;
   a photodetector unit including first and second strip-shape photodetectors approximately extending on a common plane;
   means for generating first and second return light beams on the basis of a light beam reflected and diffracted back from the medium, the first and second return light beams having different focal points, wherein centers of the first and second return light beams are received by the first and second photodetectors respectively, wherein the focal points of the first and second return light beams lie at a front side and a rear side of light-receiving surfaces of the first and second photodetectors respectively when sizes of the first and second return light beams on the light-receiving surfaces of the first and second photodetectors are equal; and
   means for detecting a difference between output signals from the first and second photodetectors, and generating a focusing-error signal in response to the detected difference;
   wherein the first and second photodetectors extend approximately in parallel; the first and second photodetectors have approximately equal widths which agree with a value $W_X$; a distance "d" between centers of the first and second return light beams on the first and second photodetectors is equal to or smaller than a sum of a value D and the value $W_X$ which is measured along a direction parallel to a line connecting the centers of the first and second return light beams; and the value D is equal to diameters of the first and second return light beams on the first and second photodetectors when the diameters of the first and second return light beams on the first and second photodetectors are equal.

2. The focusing-error detecting apparatus of claim 1 wherein the generating means comprises a prism having two reflection/transmission films.

3. The focusing-error detecting apparatus of claim 1 wherein the generating means comprises a holographic optical element.

* * * * *